(12) United States Patent
McComb et al.

(10) Patent No.: US 9,452,487 B1
(45) Date of Patent: Sep. 27, 2016

(54) EXOTHERMIC CUTTING ROD

(71) Applicant: BROCO, INC., Rancho Cucamonga, CA (US)

(72) Inventors: David Dean McComb, Highland, CA (US); Rodger W. Spriggs, Fullerton, CA (US)

(73) Assignee: BROCO, INC., Rancho Cucamonga, CA (US)

( * ) Notice: Subject to any disclaimer, the term of this patent is extended or adjusted under 35 U.S.C. 154(b) by 317 days.

(21) Appl. No.: 13/924,436

(22) Filed: Jun. 21, 2013

Related U.S. Application Data

(60) Provisional application No. 61/662,856, filed on Jun. 21, 2012.

(51) Int. Cl.
*B23K 35/04* (2006.01)
*B23K 7/00* (2006.01)

(52) U.S. Cl.
CPC ........................................ *B23K 7/00* (2013.01)

(58) Field of Classification Search
CPC .......... B23K 7/00; B23K 9/013; B23K 7/10; B23K 35/0216; B23K 35/021; E21B 7/146; F23D 14/42

USPC ............................................................ 266/48
See application file for complete search history.

(56) References Cited

U.S. PATENT DOCUMENTS

| | | | | |
|---|---|---|---|---|
| 4,432,816 A | * | 2/1984 | Kennedy et al. | 149/19.3 |
| 4,541,616 A | * | 9/1985 | Dean | 266/48 |
| 4,544,139 A | * | 10/1985 | Moore et al. | 266/48 |
| 4,864,093 A | * | 9/1989 | Henderson et al. | 219/70 |

* cited by examiner

*Primary Examiner* — Scott Kastler
*Assistant Examiner* — Michael Aboagye
(74) *Attorney, Agent, or Firm* — Knobbe Martens Olson & Bear LLP

(57) ABSTRACT

An exothermic cutting rod that comprises a tube and a plurality of wires. The wires may be cored wires that comprise various mixtures of powdered metals and other additives. The cored wires may be disposed within the inner circumference of the tube. The wires filled with powdered metals may allow the manufacturer to more quickly adjust the mixture ratios and develop a combination that has better performance characteristics, such as a reduced requirement of pure or substantially pure oxygen, or compressed gas.

14 Claims, 13 Drawing Sheets

EXOTHERMIC CUTTING ROD

INCORPORATION BY REFERENCE TO ANY PRIORITY APPLICATIONS

Any and all applications for which a foreign or domestic priority claim is identified in the Application Data Sheet as filed with the present application, including U.S. Provisional Application No. 61/662,856, filed Jun. 21, 2012, and titled EXOTHERMIC CUTTING ROD, are hereby incorporated by reference in its entirety under 37 CFR 1.57.

BACKGROUND OF THE INVENTION

1. Field of the Invention

The invention generally relates to exothermic cutting rods.

2. Description of the Related Art

Exothermic cutting rods presently consist of several different designs. One configuration is to have a tube with a plurality of inner metallic wires disposed around the inner circumference of the tube. A second configuration includes a tube with a plurality of solid metallic alloy wires inside the tube where the tube is fully stuffed with wires.

Cutting rods are used in a variety of environments, which are mostly out in the field. The military uses cutting rods for demolition and tactical operations. SWAT teams use them to breach secure locations by cutting through metal doors and gates. Divers use cutting rods underwater to cut through metal in fabrication and demolition operations.

Cutting rods work by oxidizing certain metals, which gives off a tremendous amount of heat. Some of the cutting rods burn between 7,000 and 10,000 degrees Fahrenheit. One method of using a cutting rod uses compressed oxygen. A tank of compressed oxygen may be attached to a first end of a cutting rod. When the user desires to burn the cutting rod, he may apply a flow of oxygen to the rod and apply heat in excess of the combustion temperature to a second end of the rod. The components of the rod, in the presence of heat and a stream of oxygen, will ignite; the rod components are oxidized, producing light and heat. Much of the cutting rod is consumed during the burning process. If the supply of oxygen is discontinued before the rod has been fully consumed, the flame will go out and the rod will cease to burn.

The oxygen needed for the burning process has typically been pure or almost pure oxygen. Since most of the uses of cutting rods have been in the field, the supply of oxygen is usually in the form of compressed oxygen in a portable tank. In some instances, the tank may be transported and stored in a vehicle. However, other uses require that the oxygen tank be portably attached to the user. For instance, military personnel must be able to personally transport the oxygen tank since many of the applications are in remote locations and dangerous environments. Similarly, a SWAT team member must be able to remain mobile while carrying the tank of oxygen. Tanks of compressed gasses are inherently dangerous; tanks can store a lot of potential energy, which can be released in a variety of ways. Projectiles, manufacturing defects, or damages to parts of the tank or regulator or valve, are all potential hazards. Rapidly releasing the energy will create a dangerous environment for the user and anyone within several yards (or more). When the compressed gas is pure or almost pure oxygen, the danger level is increased as oxygen can greatly accelerate combustion.

Cutting rods can also be used underwater. When used underwater, the desired performance characteristics may be different from those on land. For instance, it may be advantageous to have a cutting rod that has a longer burn time in order to give the user more time to complete the project.

Therefore, there is a need for a cutting rod that requires a reduced amount of oxygen as compared to traditional cutting rods. There is also a need for a cutting rod that requires a reduced percentage of oxygen as compared to traditional cutting rods. Additionally, there is a need for a cutting rod that requires a lower compressed gas flow as compared to traditional cutting rods. Finally, there is a need for a cutting rod for which the combustion is sustainable using an air compressor or no associated compressed gas tank.

SUMMARY OF THE INVENTION

In one embodiment, a cutting rod assembly may comprises a tube and a plurality of wires, at least one of which comprises a powder comprising a metal, wherein the amount of oxygen that has to be supplied to the cutting rod to maintain combustion of the assembly is reduced. The wires may comprise carbon steel that defines an inner space that receives the powder comprising a metal and a binder. One of the wires may comprise aluminum powder and/or magnetite. A wire may also contain iron powder and/or a binder. A wire may comprise the following, as percentages of the weight of the wire: carbon steel—64 to 80 percent; iron powder—18 to 25 percent; magnetite—4 to 14 percent; potassium carbonate—2 to 4 percent; and a binder material—0.5 to 1 percent. One of the plurality of wires may further comprise an oxidizer or a gas generator. The powder may further comprise a powdered metallic compound.

In an embodiment, a cutting rod assembly may comprise a tube comprising a plurality of wires, wherein at least one of the wires comprises a powdered compound that is selected to enhance the burn characteristics of the assembly when exposed to oxygen. The plurality of wires may comprise a powdered compound that includes at least one oxidizer, wherein the amount of oxygen that has to be supplied to the cutting rod to maintain combustion of the assembly is reduced. The burn characteristics may include a slower burn rate, requiring a lower amount of oxygen to maintain combustion, or substantially producing a gas. The wires may comprise carbon steel that defines an inner space that receives the powder and a binder. The wires may also comprise aluminum or magnetite. A wire may comprise the following, as percentages of the weight of the wire: carbon steel—64 to 80 percent; iron powder—18 to 25 percent; magnetite—4 to 14 percent; potassium carbonate—2 to 4 percent; and a binder material—0.5 to 1 percent.

In an embodiment, a cutting rod assembly may comprise a tube and a powdered compound that is selected to enhance the burn characteristics of the assembly when exposed to oxygen. The tube may define an inner circumference, wherein the powdered compound may be disposed along at least part of the inner circumference. The tube may define an outer circumference, wherein the powdered compound may be disposed along at least part of the outer circumference.

DETAILED DESCRIPTION OF THE PREFERRED EMBODIMENT

Cutting rods have typically been constructed with solid wires, with each wire comprising a pure metal or an alloy mixture of components. The alloy composition of the wires may affect the performance characteristics of the cutting rod. Performance characteristics may include any of the following: burn time, flame temperature, amount flame is focused, gas generation, worker safety, and oxygen requirements. Desired performance characteristics may include: longer burn time, hotter flame temperature, more focused flame, higher gas generation, higher worker safety, or reduced oxygen requirements, all as compared to traditional cutting rods, or any other reason that may benefit the user in some way. Therefore, it may be advantageous to alter the composition of the wires in order to achieve one or more of the desired performance characteristics. However, changing the composition of a solid alloy wire can be a very expensive and time consuming process. Using a cored wire comprising a powdered metal mixture may allow the manufacturer to easily change the composition of cored wire and therefore change the performance characteristics of the cutting rod.

The result of a cutting rod that comprises cored wires with easily changed compositions is that a cutting rod may be developed that uses less oxygen or less compressed gas. A rod that requires less oxygen but still needs compressed gas may be advantageous because only a very small cylinder of oxygen need be transported by the user; the compressed gas could be produced at the site using an air compressor, or other means. This may be safer as there is not as much compressed oxygen or compressed gas that could cause harm if it escapes. A cutting rod that requires less oxygen and less compressed gas may alleviate the need for an oxygen cylinder altogether. One method of reducing the need for oxygen in the cutting rod may be to add oxidizers to the powdered material in the cored wires. For example, magnetite and aluminum, commonly known as thermite, may be added to the assembly to reduce the need for additional oxygen to be added to the process. In other embodiments, it may be advantageous for the cutting rod to comprise a gas generator. Examples of a gas generator may include carbon, gun powder, polytetrafluoroethylene (PTFE), or any other element or compound that substantially creates a gas when heated or oxidized. In some instances, a gas generating compound may increase the force of the flame coming from the cutting rod assembly, or may help clear oxidized material from the cutting rod assembly.

Figure 1:
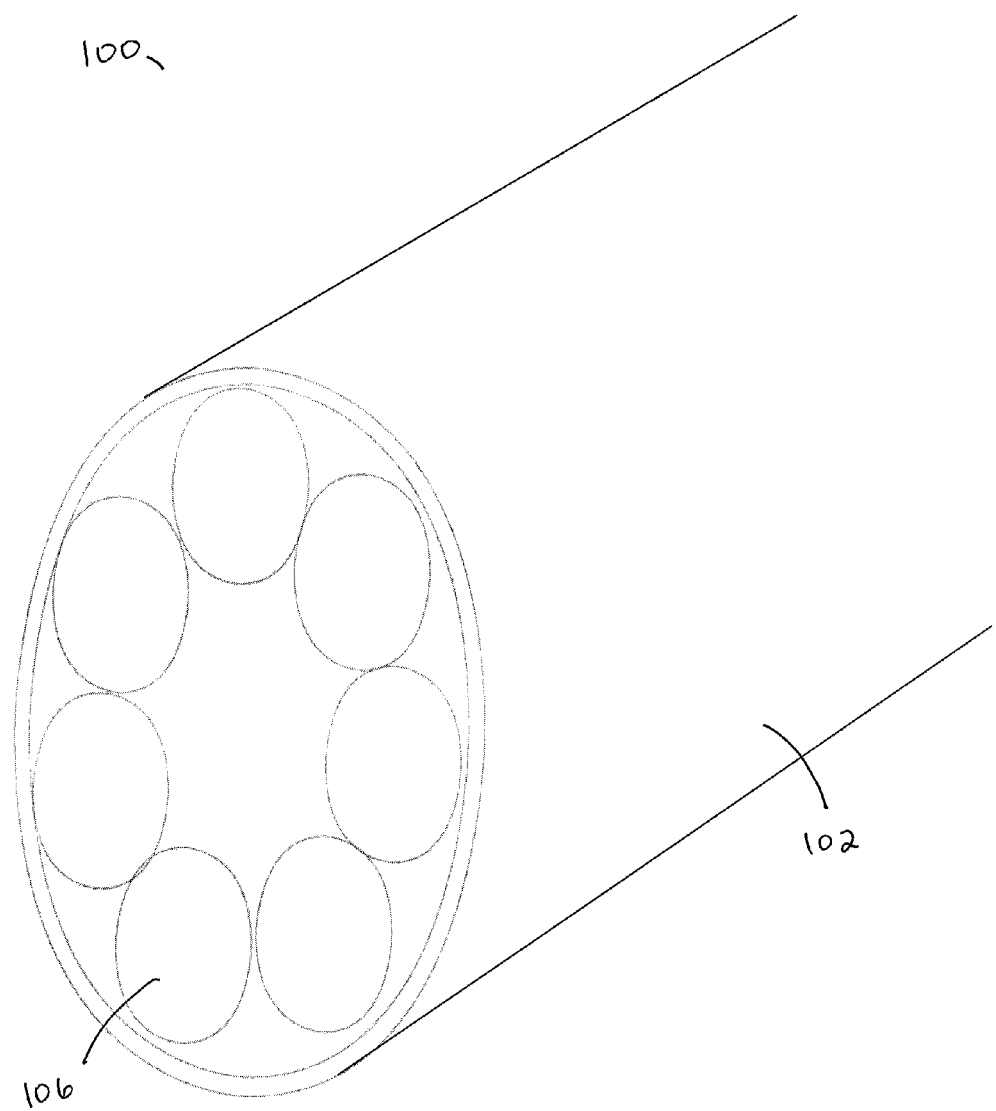
FIG. 1 shows a perspective view of one embodiment of a cutting rod.
Figure 2:
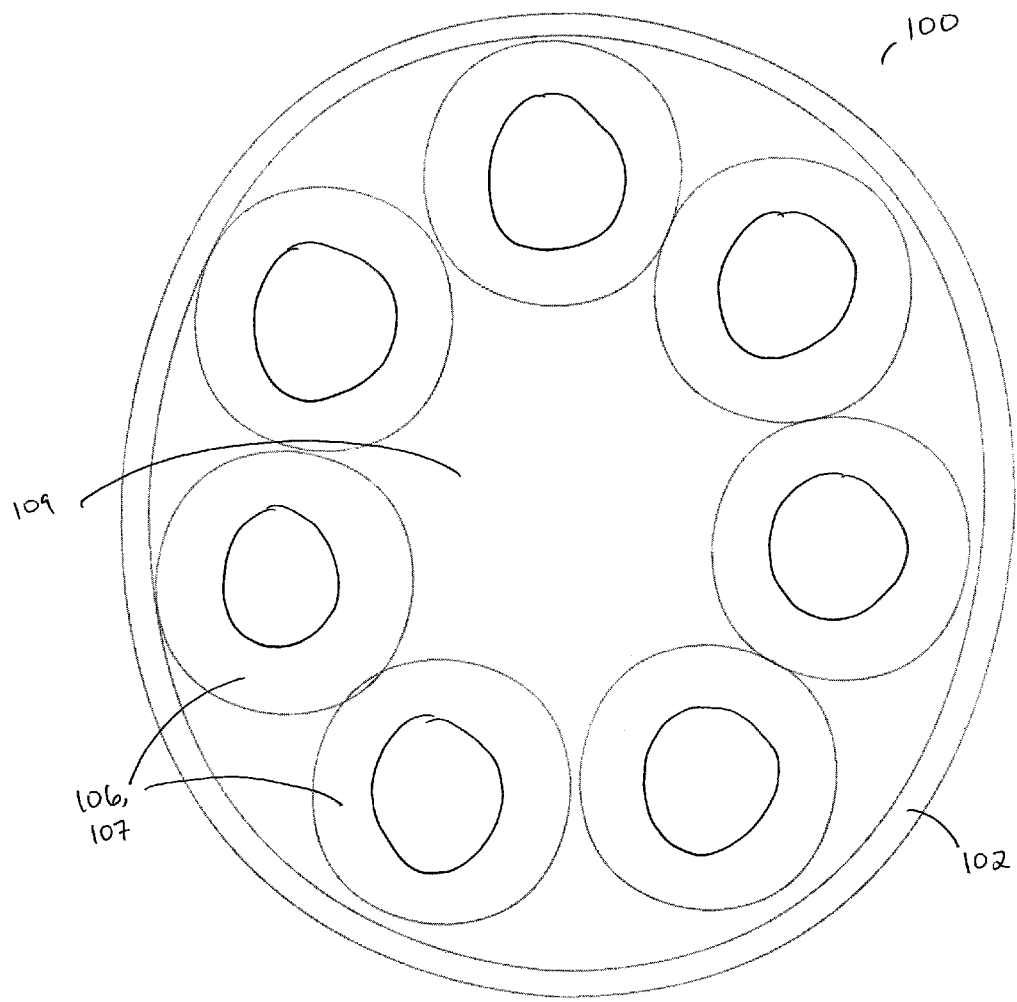
FIG. 2 shows a cross-sectional end view of one embodiment of a cutting rod.

In one embodiment, shown in FIGS. 1 and 2, an exothermic cutting rod 100 comprises a tube 102 and a plurality of wires 106. The wires 106 may be standard solid wires or may be specially fabricated cored wires 107. Cored wires 107, shown in FIGS. 3, 4A, and 4B, may comprise a sheath 112 and a powder 114 in the center. The cored wires 107 may be disposed along the inner circumference of the tube 102 or placed in other configurations within the tube 102. In one embodiment, the plurality of wires 106 substantially lines the inner circumference of the tube 102. In an embodiment there are seven wires 106 disposed on the inner circumference of the tube 102, as shown in FIG. 2. In another embodiment there are six wires 106 disposed on the inner circumference of the tube. The wires 106 may be kept in place by friction, an adhesive, crimping or bending, or other standard means. In an embodiment, the configuration of wires 106 on the inner circumference is accompanied by a space 109 in the center of the tube 102. In one embodiment the space 109 in the middle of the tube 102 has a diameter of approximately one of the plurality of wires 106. In other embodiments, the space may be greater or smaller.

Figure 4A:
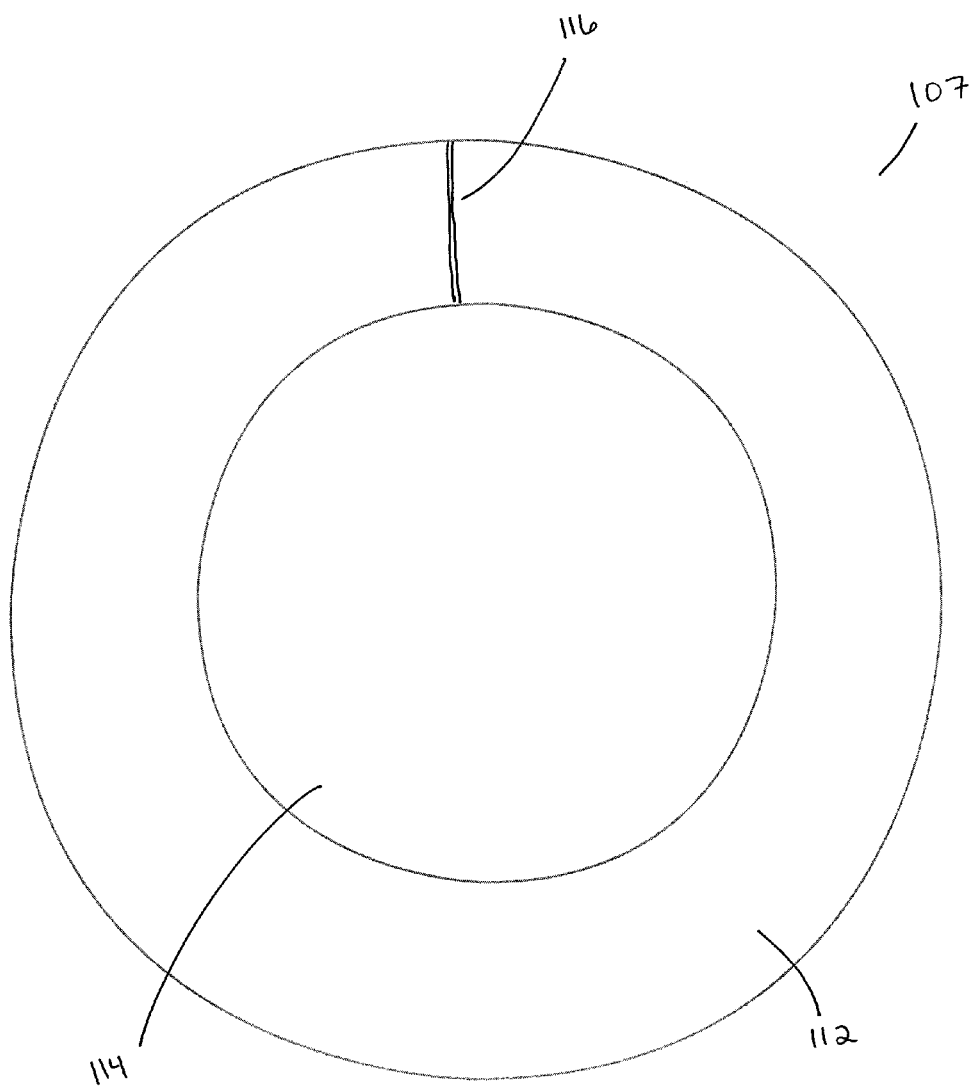
FIG. 4A shows a cross-sectional end view of a second embodiment of a cored wire.
Figure 4B:
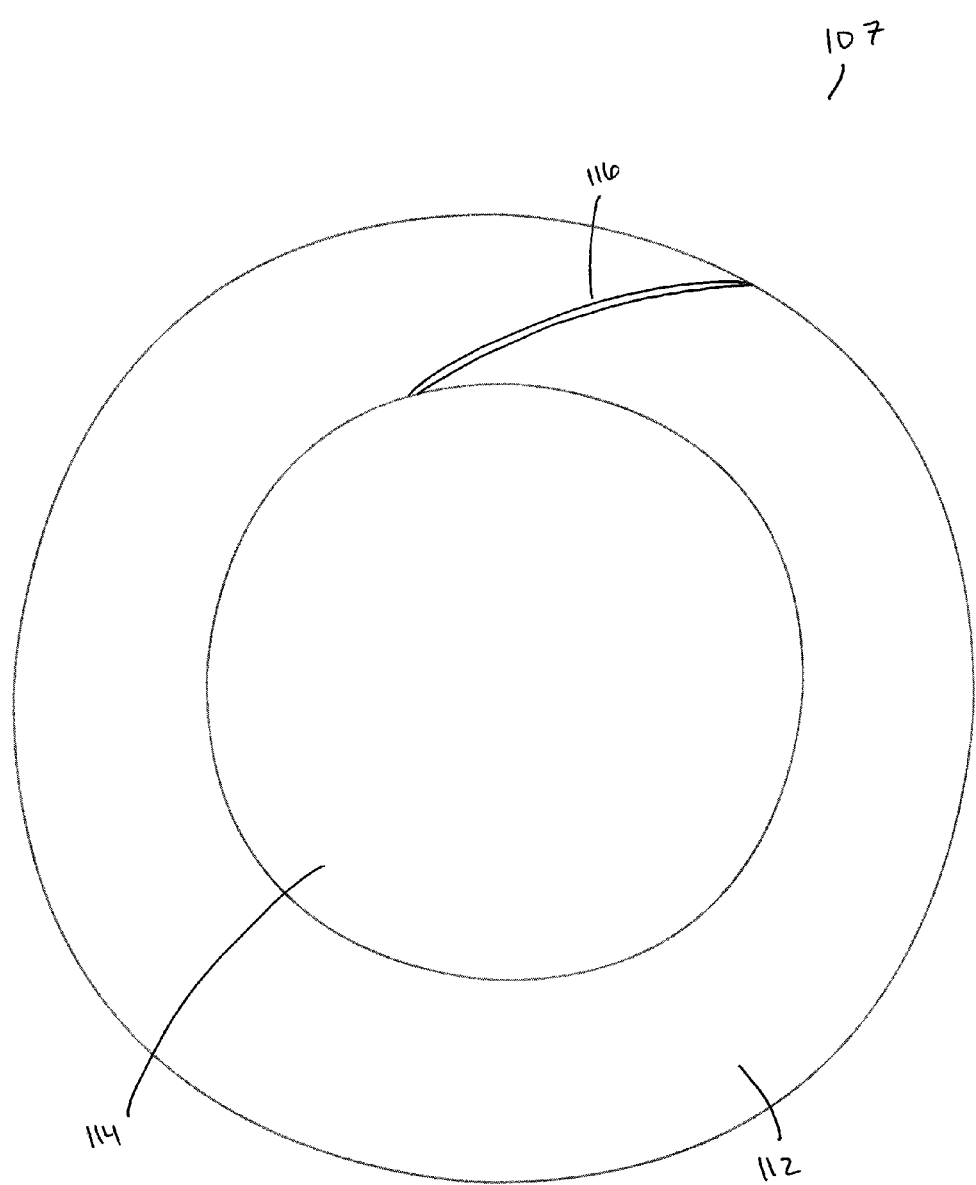
FIG. 4B shows a cross-sectional end view of a third embodiment of a cored wire.
Figure 5:
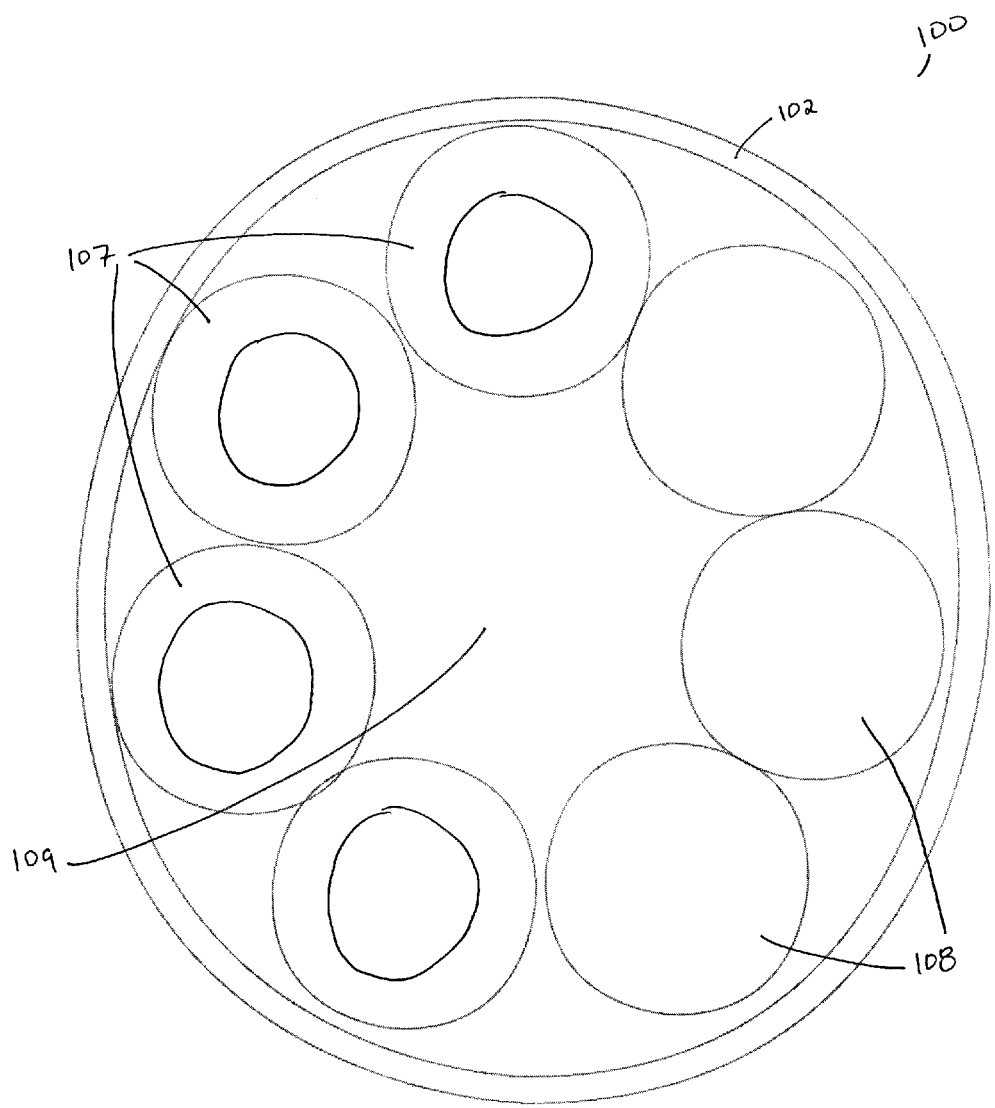
FIG. 5 shows a cross-sectional end view of a another embodiment of a cutting rod.
Figure 6:
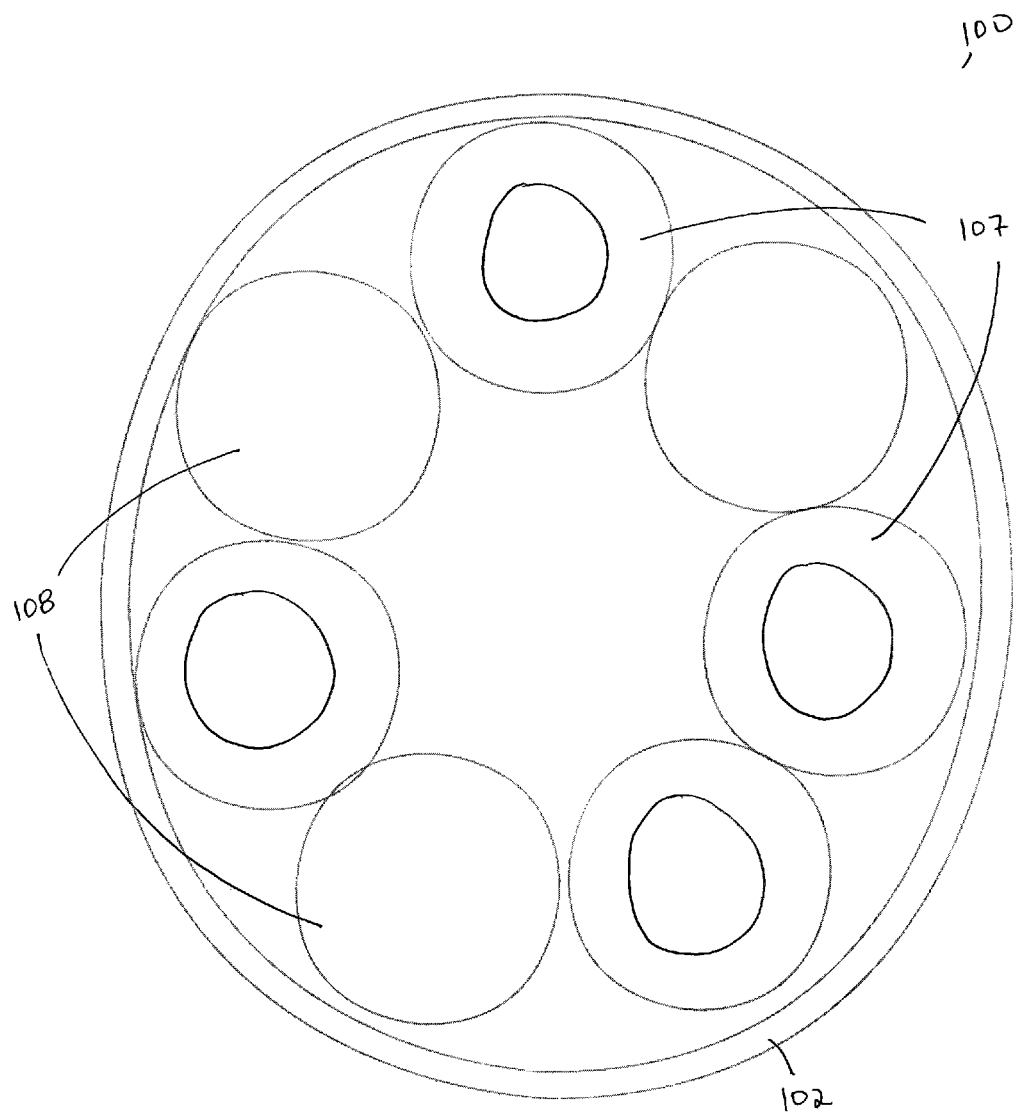
FIG. 6 shows a cross-sectional end view of a another embodiment of a cutting rod.

In another embodiment, shown in FIGS. 5 and 6, an exothermic cutting rod 100 comprises a tube 102 and a plurality of wires 106. The wires 106 may comprise both standard solid metal or alloy mixture wires and specially fabricated cored wires 107. Cored wires 107, shown in FIGS. 3, 4A, and 4B, may comprise a sheath 112 and a powder 114 in the center. The wires 106 may be disposed along the inner circumference of the tube 102 or placed in other configurations within the tube 102. In one embodiment, the plurality of wires 106 substantially lines the inner circumference of the tube 102. FIG. 5 shows one of the many possible configurations wherein cored wires 107 are on one side of the tube 102 and standard wires 108 are on the other side of the tube 102. FIG. 6 shows another of the many possible configurations wherein cored wires 107 and standard wires 108 are both general distributed throughout the tube 102.

The tube 102 may be comprised of a metallic component. A metallic component may include carbon or aluminum or other metal suitable for a cutting rod. The tube 102 may be comprised of a non-metallic component, which may include plastic or other material that is suitable for a cutting rod design. The tube 102 of the cutting rod 100 may be between ⅛ and ¾ inches in outside diameter. In one embodiment the cutting rod 100 is approximately ⅜ inches in outside diameter. The tube 102 of the cutting rod 100 may be between 1/16 and 11/16 inches in inside diameter. In one embodiment the cutting rod 100 is approximately 5/16 inches in inside diameter. The tube 102 may be between approximately 6 inches and 144 inches long. In one embodiment, the tube 102 is 18 inches long. In another embodiment, the tube 102 is 24 inches long. In yet another embodiment, the tube 102 is 36 inches long. The tube 102 or assembly 100 may be coated with an electrical insulator or other coating. The insulator or coating may be advantageous in that it may protect the user (from electrical shock or otherwise), prevent corrosion or other degradation of the material, or enhance the performance characteristics of the cutting rod.

Figure 7:
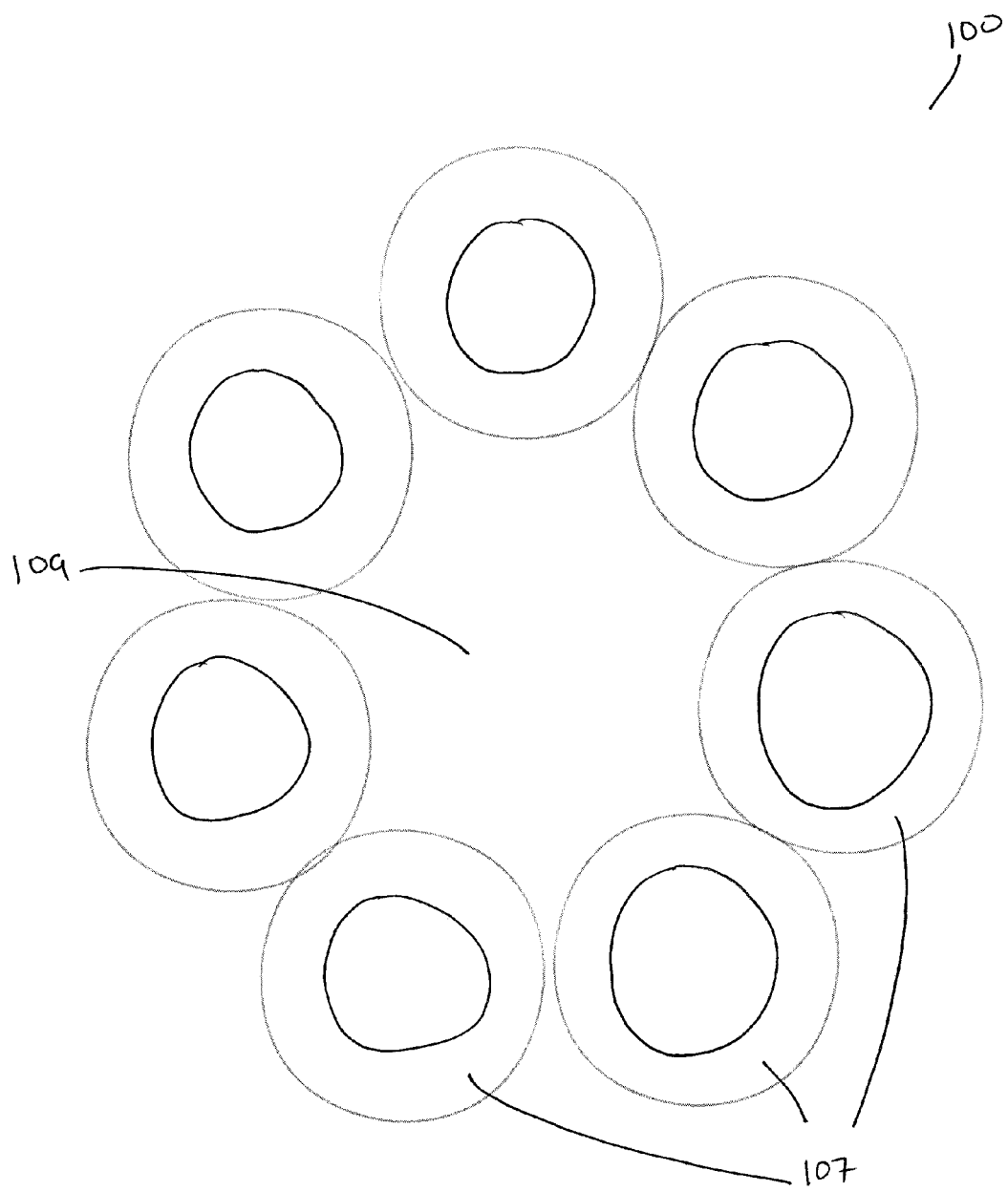
FIG. 7 shows a cross-sectional end view of a another embodiment of a cutting rod.

In another embodiment, the cutting rod 100 may comprise a plurality of wires 106 that are configured such that no tube 102 is needed, as shown in FIG. 7. In one embodiment, the wires 106 are connected such that the rod 100 substantially holds its shape and retains enough of a space or conduit 109 between the wires and that any needed oxygen or compressed gas can adequately flow through the rod 100. In another embodiment, the wires 106 may be held in a desired orientation by a cutting torch device (not shown). In this embodiment, the wires 106 may be fed through one or more openings in a cutting torch device. The wires 106 being fed may move uniformly or independently of one another.

Figure 3:
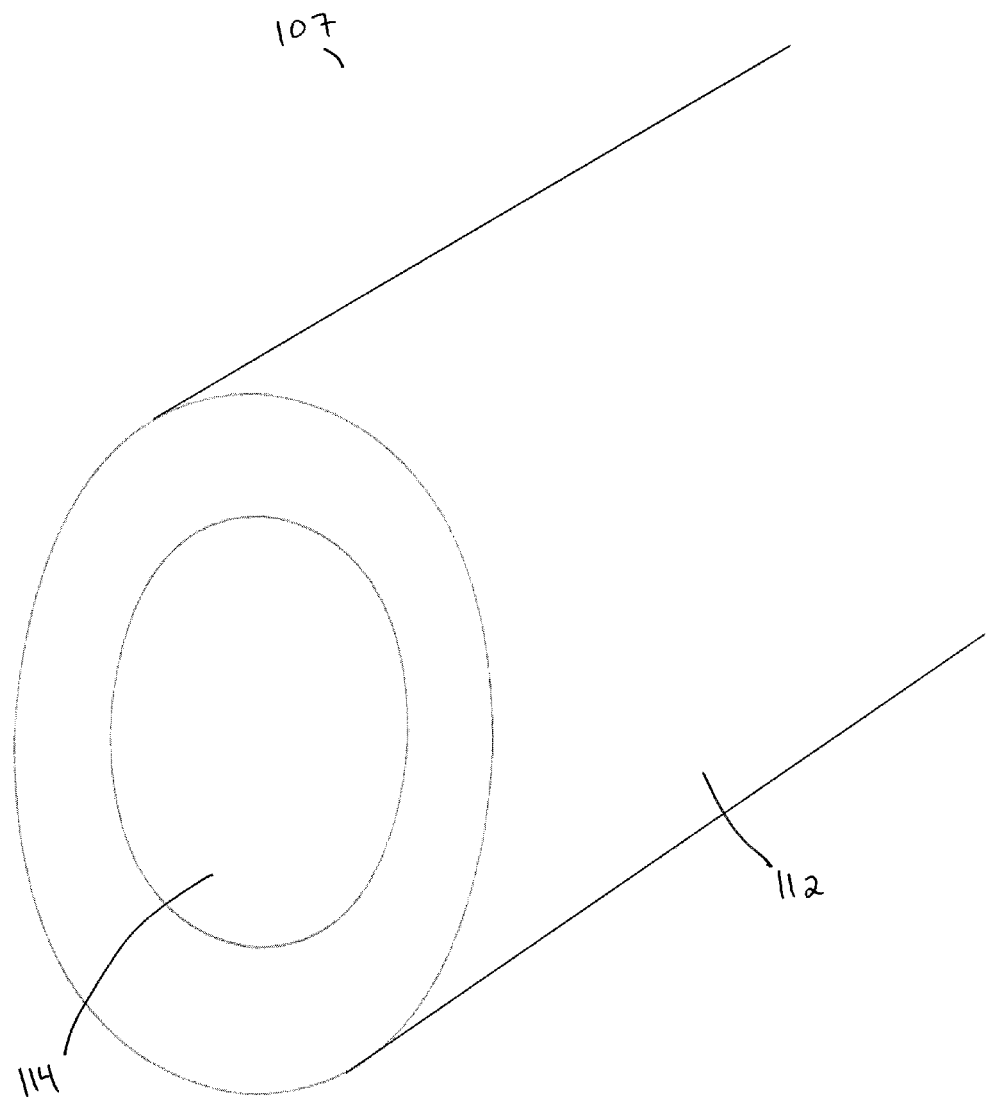
FIG. 3 shows a perspective view of one embodiment of a cored wire.

The cored wires 107 may be fabricated using a variety of methods. The wires 107 may be formed with a powder 114 in the center; the powder 114 selected may enhance the performance characteristics (listed above) of the cutting rod. The cored wires 107 may comprise an outer shell 112 and an inner powder 114, as depicted in FIGS. 3, 4A, and 4B.

In one embodiment a cored wire 107 is fabricated using a strip of sheet metal, such as a carbon steel strip or other metal suitable for a cutting rod 100. The size of a steel strip may be dictated by the method of wire formation and the desired size of the finished product. The strip may be formed in the shape of a "U", into which the powder 114 is placed. The strip may then be folded over or rolled such that a wire 107 is formed with a powder 114 in its interior.

In another embodiment a cored wire 107 is fabricated using a hollow cylinder. Powdered material 114 may be added to the cylinder through an end of the cylinder or through a slit 116. The slit 116 may then be crimped closed or filled with a filler material to prevent the powdered material 114 from exiting. Once the cylinder contains the powdered material 114, the cylinder may be drawn down to decrease the outer diameter of the cylinder, if so desired.

In another embodiment, an indentation or slit 116 may be created in a solid wire. The powdered material 114 may be added to the indentation or slit 116. The wire may then be closed by adding filler material on top of the powdered material 114, or by closing the indentation or slit 116 by crimping or squeezing the wire. Other methods of manufacturing a cored wire 107 may include those standard to the industry. The slit 116 may be radially from the core to the outer circumference, FIG. 4A, or the slit 116 may be disposed in a radial and circumferential direction, FIG. 4B. The slit 116 in FIG. 4B may be the result of a rolling, joining, folding, or similar process.

The finished product of producing a cored wire 107 may include a wire with powder 114 on the inside. The cored wire 107 may have a sheath 112 that has been folded over, rolled over, ends overlapping, ends butted against each other, or the sheath 112 may be seamless.

The cored wires 107 may be between 1/32 and 1/4 inches in outside diameter. In one embodiment the cored wires 107 are approximately 3/32 in outside diameter. The length of the wires 107 may be dictated by the desired length of the cutting rod 100.

Figure 8:
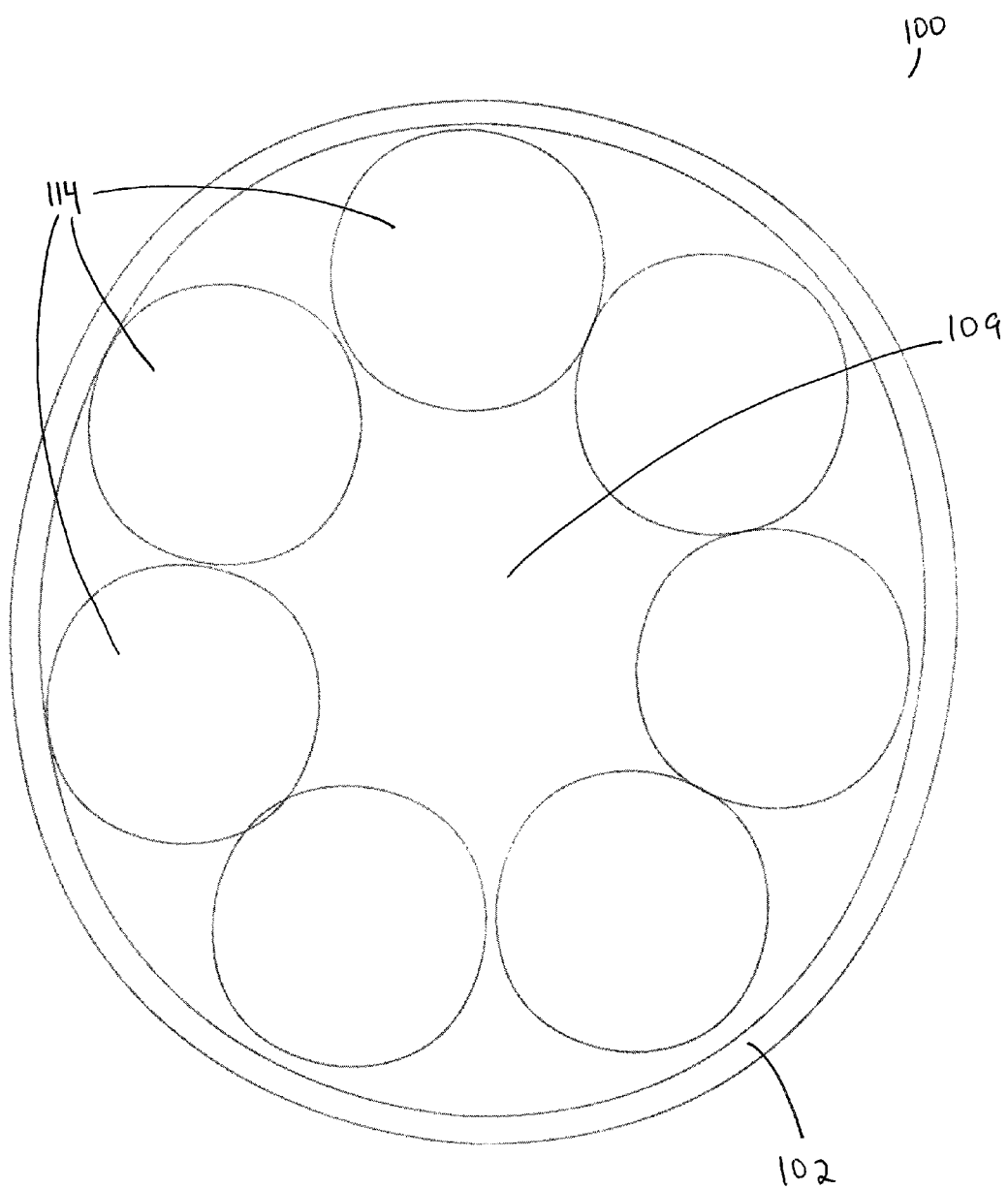
FIG. 8 shows a cross-sectional end view of a another embodiment of a cutting rod.

In one embodiment, shown in FIG. 8, an exothermic cutting rod 100 comprises a tube 102 and a plurality of wires 106. The wires 106 may be entirely or substantially entirely comprised of powdered material 114. The wires 106 may be disposed along the inner circumference of the tube 102 or placed in other configurations within the tube 102. In one embodiment, the plurality of wires 106 substantially lines the inner circumference of the tube 102. The wires 106 may be kept in place by friction, an adhesive, crimping or bending, or other standard means. In an embodiment, the configuration of wires 106 on the inner circumference is accompanied by a space 109 in the center of the tube 102.

Figure 9:
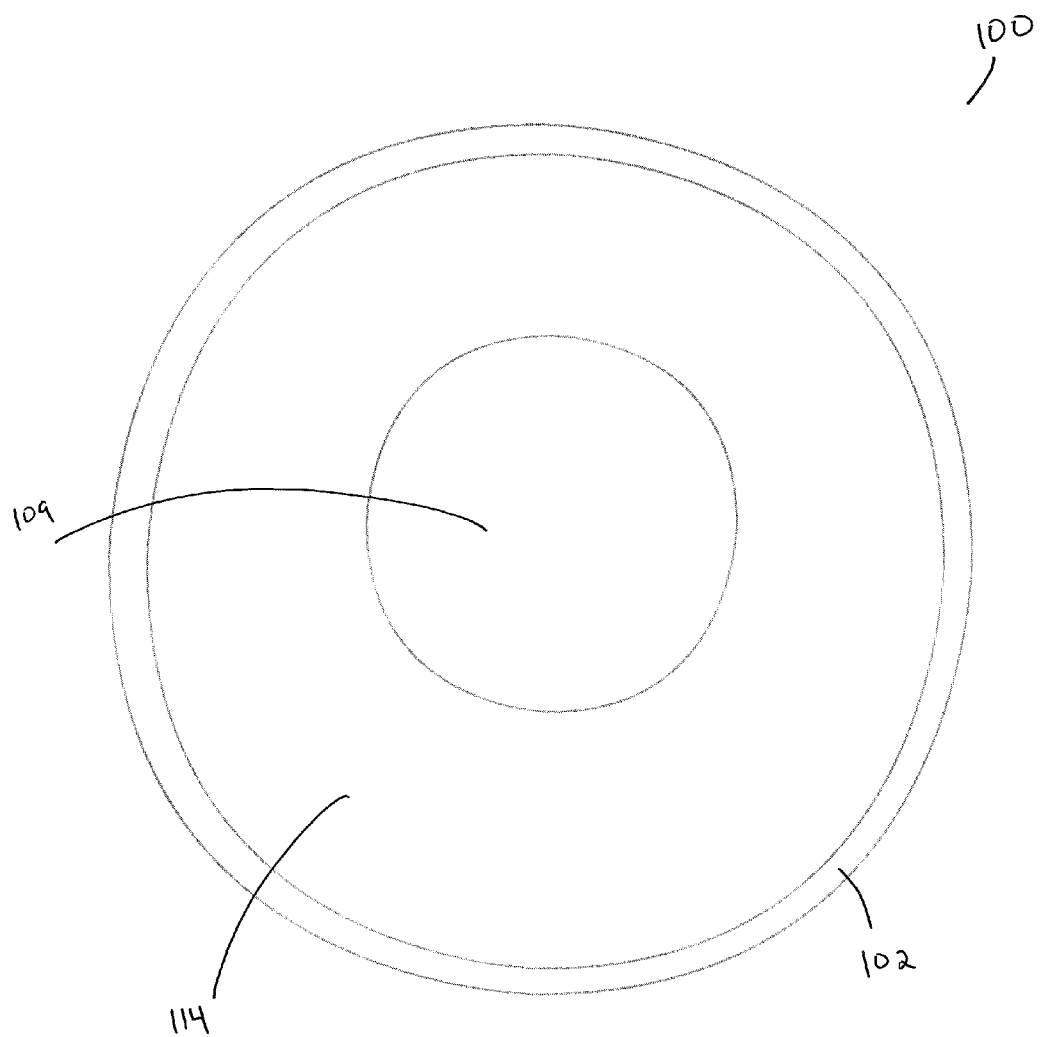
FIG. 9 shows a cross-sectional end view of a another embodiment of a cutting rod.

In another embodiment, the tube 102 may comprise a powdered material 114 disposed on the inner circumference of the tube 102, as shown in FIG. 9. Additional wires 106 or cored wires 107 may be omitted. In this embodiment, the powdered material 114 may comprise a binder, such that the mixture is disposed within the tube 102 without the need for one or more wires 106 containing powdered material 114. An opening in the middle of the tube 102 may be present to facilitate the flow of oxygen or gas during the combustion process.

Figure 10:
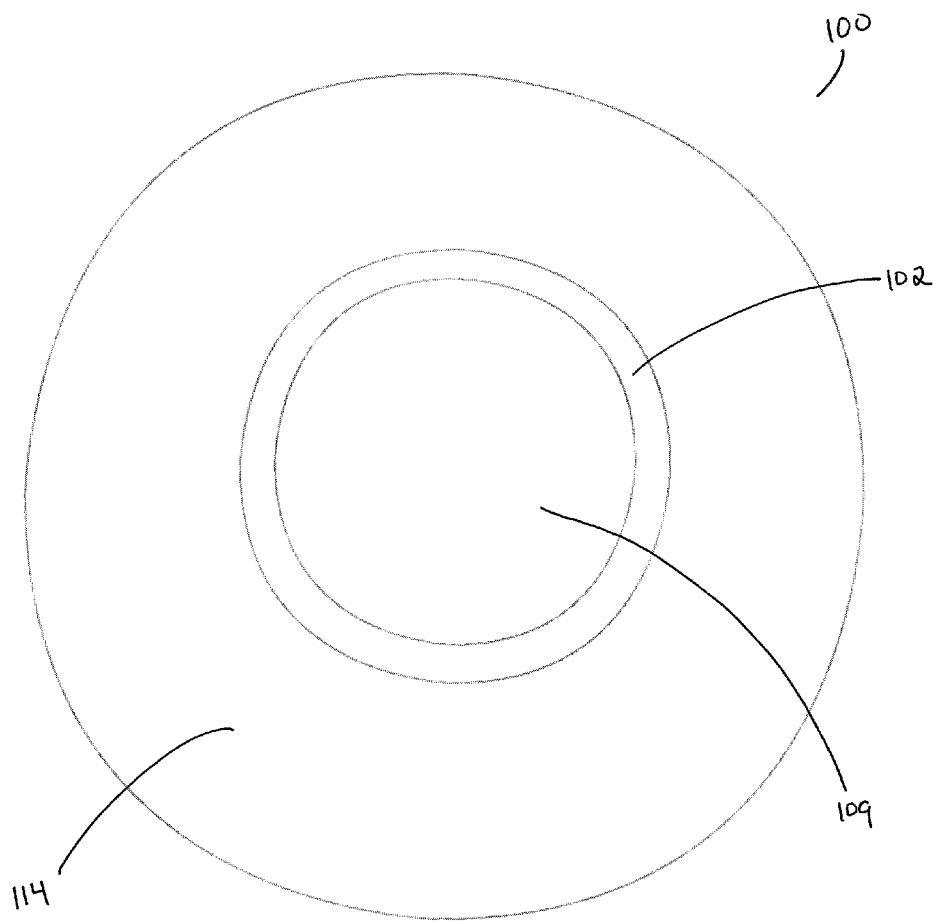
FIG. 10 shows a cross-sectional end view of another embodiment of a cutting rod

In another embodiment, the powdered material 114 is disposed on the outside of a tube 102, as shown in FIG. 10. The tube may comprise an opening to facilitate the flow of oxygen or gas during the combustion process. In some embodiments, the powdered material 114 is encased in a metallic or non-metallic sheath (not shown). In other embodiments, the powdered material 114 is exposed to the atmosphere and is not enclosed or protected.

Figure 11:
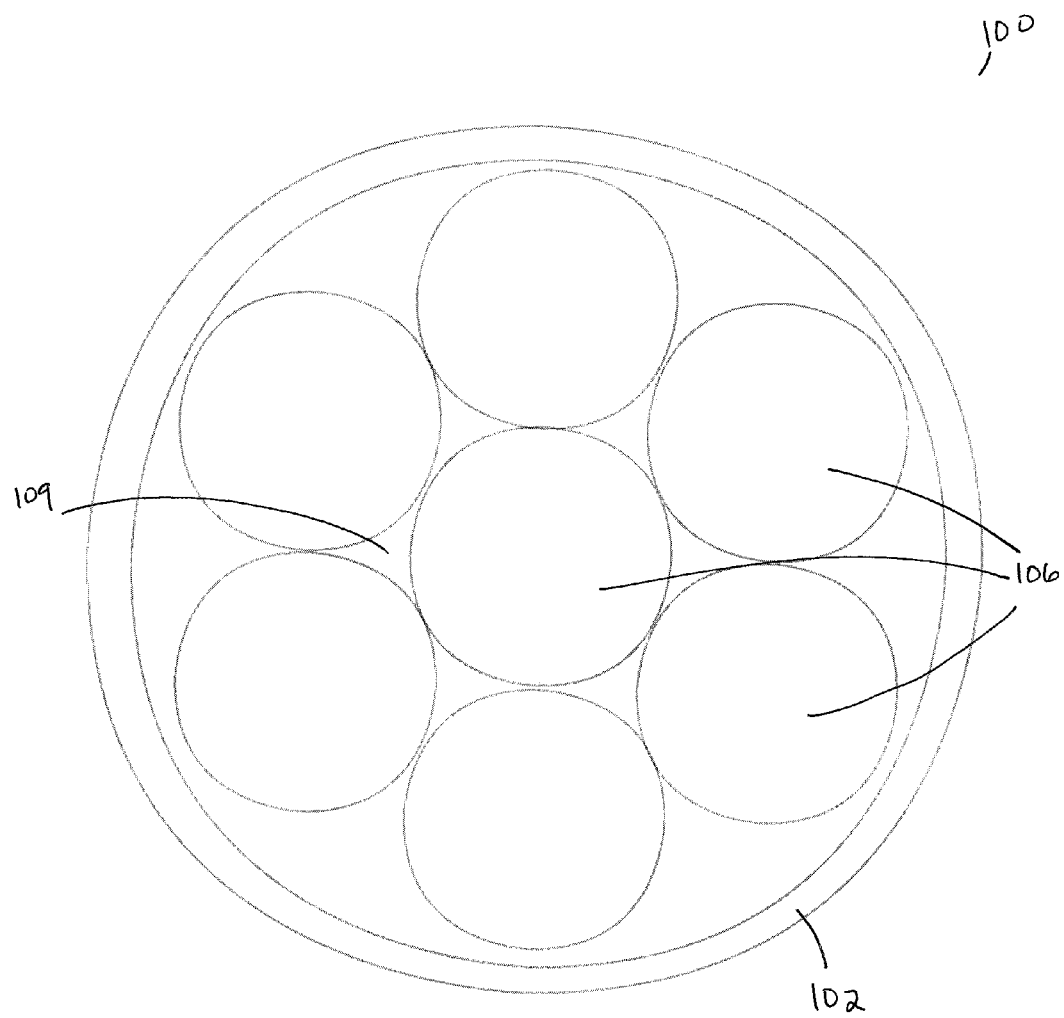
FIG. 11 shows a cross-sectional end view of a another embodiment of a cutting rod.

In another embodiment, the tube 102 comprises a plurality of cored wires 107 and solid wires 108, such that the space 109 is reduced, as compared to other embodiments, as shown in FIG. 11. The number of wires 106 that are disposed within the tube 102 may vary greatly depending on the size of the tube 102 and the size of the wires 106. Furthermore, not all of the wires 106 need have the same dimensions.

Figure 12:
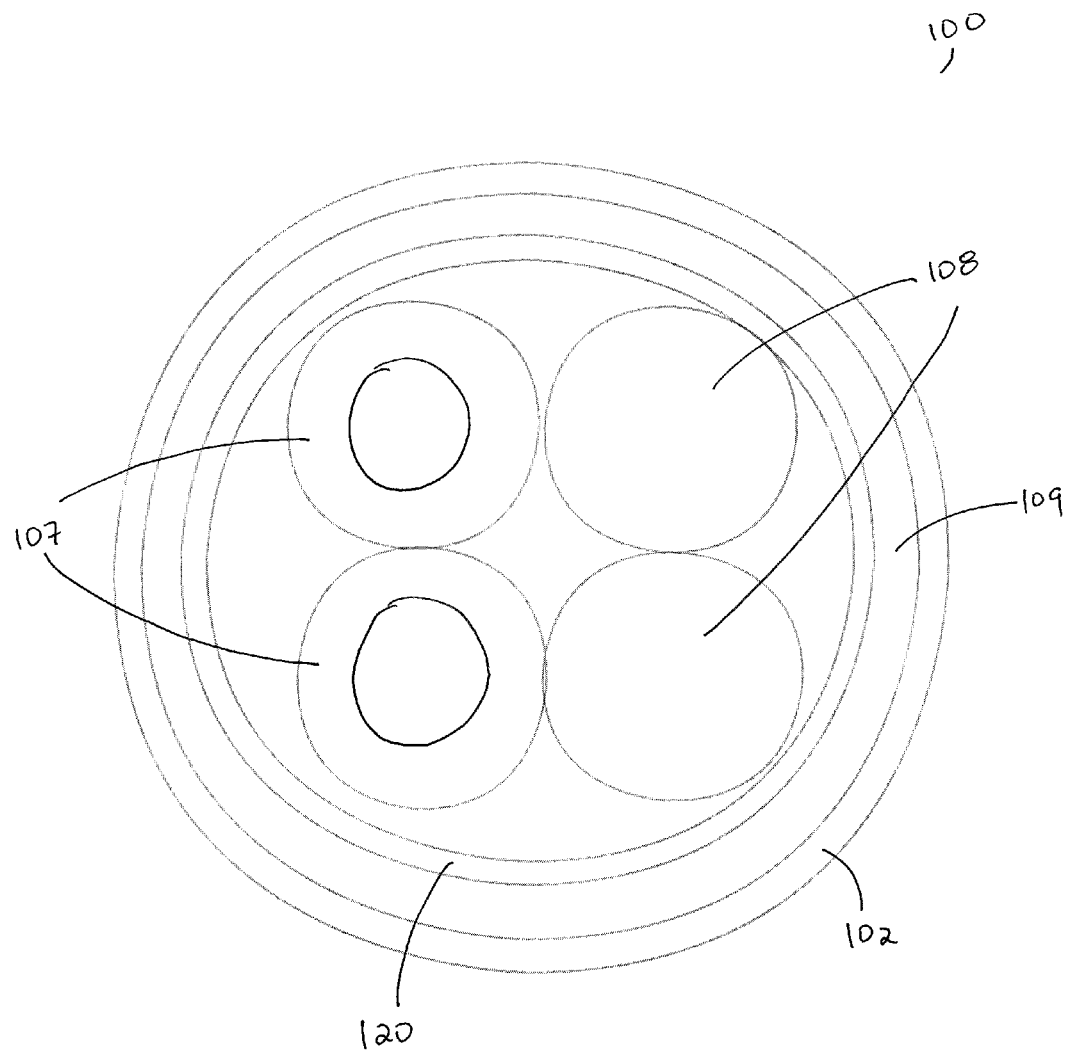
FIG. 12 shows a cross-sectional end view of another embodiment of a cutting rod.

In yet another embodiment, the tube 102 comprises a second tube 120, which comprises a plurality of cored wires 107, as shown in FIG. 12. There may be a space 109 between the tube 102 and second tube 120 such that gas may flow through the gap. In other embodiments, there may be no space 109 between the tube 102 and the second tube 120.

In some embodiments the powder 114 may include any of the following materials: iron powder, magnetite, aluminum powder, magnesium powder, polytetrafluoroethylene (PTFE) powder, iron oxide, heavy metal carbonates, cast iron powder, graphite, or other pyrotechnic powders. The fill proportion and combination of powders can be tailored for the desired effect and performance criteria, described above.

In one embodiment, the cored wire 107 is filled with 100% iron powder. The powder 114 may comprise between 15 and 45% of the weight of the cored wire, depending on the cut requirements and the application. Alternatively, the cored wires 107 may be comprised of a variety of different materials in different percentages. In one very specific example, the percentages, by weight, are as follows: carbon steel strip: 64-80%; iron powder 18-25%; aluminum 4-12%; magnetite 4-14%; potassium carbonate 2-4%; and binder material 0.5-1%. The exact chemistry of the material within the cutting rod will vary depending on the application.

Any features of the embodiments shown and/or described in the figures that have not been expressly described in this text, such as distances, proportions of components, etc. are also intended to form part of this disclosure. Additionally, although this invention has been disclosed in the context of various embodiments, features, aspects, and examples, it will be understood by those skilled in the art that the present invention extends beyond the specifically disclosed embodiments to other alternative embodiments and/or uses of the invention and obvious modifications and equivalents thereof. Accordingly, it should be understood that various features and aspects of the disclosed embodiments can be combined with, or substituted for, one another in order to perform varying modes of the disclosed inventions. Moreover, any component or combination of components disclosed herein can be used in other structures or configurations of containers. Thus, it is intended that the scope of the present invention herein disclosed should not be limited by the particular disclosed embodiments described above.

What is claimed is:

1. A cutting rod assembly comprising:
   a tube; and
   a plurality of wires, at least one of which comprises carbon steel that defines an inner space that receive a binder and a powder wherein the powder includes a metal, wherein a amount of oxygen that has to be supplied to the cutting rod to maintain combustion of the assembly is reduced and wherein the at least one wire that comprises carbon steel that defines an inner space that receives a binder and a powdered compound is formed so that carbon steel comprises 64 to 80 percent by weight of the wire, iron powder comprises 18 to 25 percent by weight of the wire, aluminum comprises 4 to 12 percent by weight of the wire, magnetite comprises 4 to 14 percent by weight of the wire, potassium carbonate comprises 2 to 4 percent by weight of the wire, and the binder material comprises 0.5 to 1 percent by weight of the wire.

2. The assembly of claim 1, wherein at least one of the wires comprises aluminum powder and wherein at least one of the wires comprises magnetite.

3. The assembly of claim 1, wherein at least one of the plurality of wires further comprises an oxidizer.

4. The assembly of claim 1, wherein at least one of the plurality of wires further comprises a gas generator.

5. The assembly of claim 1, wherein the powder further comprises a powdered metallic compound.

6. A cutting rod assembly comprising:
a tube, comprising a plurality of wires;
wherein at least one of the wires comprises carbon steel that defines an inner space that receive a binder and a powdered compound that is selected to improve the performance characteristics of the assembly when exposed to oxygen wherein at least one of the wires comprise aluminum powder and wherein at least one of the wires comprise magnetite and wherein the at least one wire that comprises carbon steel that defines an inner space that receives a binder and a powdered compound is formed so that carbon steel comprises 64 to 80 percent by weight of the wire, iron powder comprises 18 to 25 percent by weight of the wire, aluminum comprises 4 to 12 percent by weight of the wire, magnetite comprises 4 to 14 percent by weight of the wire, potassium carbonate comprises 2 to 4 percent by weight of the wire, and the binder material comprises 0.5 to 1 percent by weight of the wire.

7. The assembly of claim 6, wherein the plurality of wires comprising a powdered compound includes at least one oxidizer such that the amount of oxygen that has to be supplied to the cutting rod to maintain combustion of the assembly is reduced.

8. The assembly of claim 6, wherein the improved performance characteristics of the assembly includes a slower burn rate.

9. The assembly of claim 6, wherein the improved performance characteristics of the assembly includes requiring a lower amount of oxygen to maintain combustion.

10. The assembly of claim 6, wherein the improved performance characteristics of the assembly includes substantially producing a gas.

11. The assembly of claim 6, wherein the wires comprise carbon steel that defines an inner space that receives the powder and a binder.

12. A cutting rod assembly comprising:
a tube having a plurality of wires; at least one of which comprises carbon steel that defines an inner space that receive a binder and
a powdered compound that is selected to enhance the performance characteristics of the assembly when exposed to oxygen; and wherein the at least one of the wires comprise aluminum powder and wherein at least one of the wires comprise magnetite and wherein the carbon steel comprises 64 to 80 percent by weight of the wire, iron powder comprises 18 to 25 percent by weight of the wire, aluminum comprises 4 to 12 percent by weight of the wire, magnetite comprises 4 to 14 percent by weight of the wire, potassium carbonate comprises 2 to 4 percent by weight of the wire, and the binder material comprises 0.5 to 1 percent by weight of the wire.

13. The assembly of claim 12, wherein the tube defines an inner circumference, and wherein the powdered compound is disposed along at least part of the inner circumference.

14. The assembly of claim 12, wherein the tube defines an outer circumference, and wherein the powdered compound is disposed along at least part of the outer circumference of the tube.

* * * * *